May 7, 1968   H. D. SHORT   3,382,308
METHOD OF FORMING A HEAT SHRINKABLE STRESS CONTROL CONE
Filed Sept. 7, 1965

*INVENTOR.*
HERBERT DOUGLASS SHORT
BY~ *Fetherstonhaugh & Co.*
ATTORNEYS

United States Patent Office 3,382,308
Patented May 7, 1968

3,382,308
METHOD OF FORMING A HEAT SHRINKABLE STRESS CONTROL CONE
Herbert Douglass Short, Newmarket, Ontario, Canada, assignor to Lacal Industries Limited, Newmarket, Ontario, Canada
Filed Sept. 7, 1965, Ser. No. 485,412
2 Claims. (Cl. 264—249)

ABSTRACT OF THE DISCLOSURE

The invention is a method of forming a stress control on an electrical conductor where the conductor terminates by arranging a plurality of heat shrinkable tubular sections around the conductor with their ends progressively staggered so as to define a stress control cone profile.

---

Figure 1:
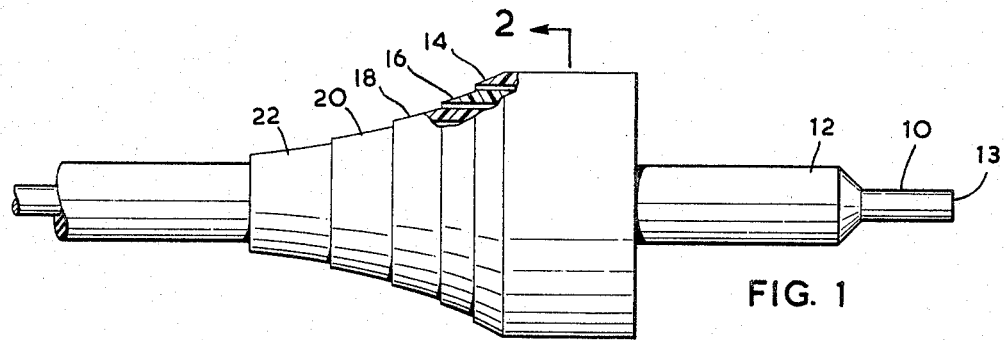

This invention relates to the formation of a stress control cone for the jointing and terminating of electric cables.

When electric cables over a certain voltage rating are jointed or terminated, it becomes necessary to build up the cable insulant to a diameter greater than that of the cable insulant to form a cone for controlling the electric stresses prevailing between the cable conductor as one electrode and ground as the other electrode of zero potential such that the transition between the built up diameter and the cable insulant results in a boundary profile known as a stress control cone profile. The design and theory of stress control cones for joints is discussed in a paper by H. D. Short in the Transactions of the American Institute of Electrical Engineers, vol. 68, 1949. The design considerations and analytic theory given in this paper for joint designs are equally applicable to the design of cable terminations.

It has been the practice to build stress control cones by hand application of relatively narrow insulating tapes or preformed rolls. These arrangements take considerable time to apply and they are costly from the labour point of view as well as the manufacturing point of view. Kits for moulding stress control cones directly on to cables from a plastic material have also been used. These units involve a mould that is placed around the cable and a liquid plastic material that is injected into the mould and permitted to set. Both prior art means for building up stress cones have the overall disadvantage of high cost whether it be in the manufacturing or the labour of application.

This invention overcomes these disadvantages by providing a low cost assembly for making stress control cones that can be readily applied in the field with a relatively low labour cost.

Generally speaking, a stress control cone according to this invention comprises a plurality of tubular sections of a shrinkable dielectric material adapted to fit within each other for disposition in a concentric arrangement to form the required build up of insulant when shrunk over the cable insulation. The tubular sections have varied lengths of predetermined measurements whereby the ends of each of the sections can be arranged to extend progressively further than the free end of the section immediately outside thereof to form a stress control cone having an exponential stress cone profile as previously computed by mathematical analysis and due regard for the electric stresses involved and the dielectric constants of the several insulating materials comprising the cable insulant and the joint or terminal insulant and/or the stress control cone. In use, the rings are of sufficient size before shrinking that they can be slipped over the cable insulant, and then arranged in position and shrunk to form the diameter and profile of the stress control cone as previously determined by calculations as aforesaid and in accordance with the principles and mathematics developed in the aforementioned paper by Short. The invention will be clearly understood after reading the following detailed specification read in conjunction with the drawings.

Figure 2:
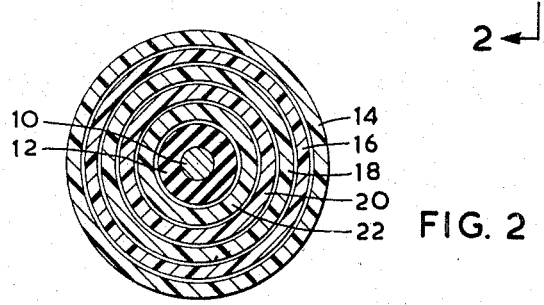
Figure 3:
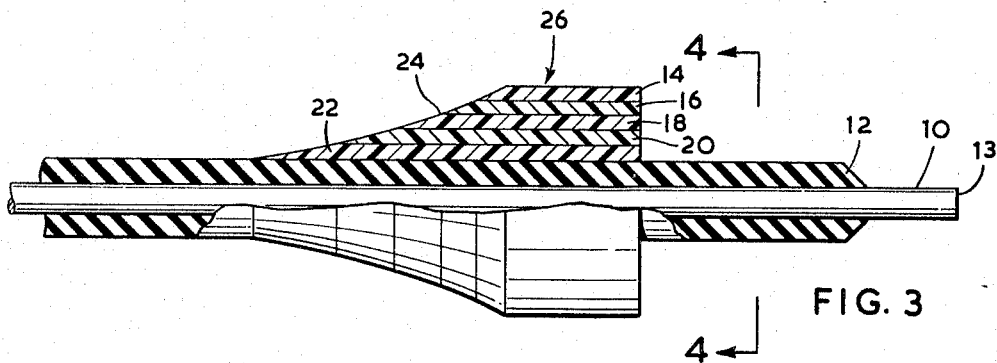
Figure 4:
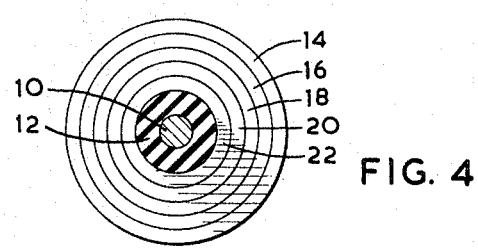

In the drawings,
FIGURE 1 is a view of series of unshrunk sleeves on a cable end;
FIGURE 2 is a view along the line 2—2 of FIGURE 1;
FIGURE 3 is a sectional view illustrating the sleeves in a shrunk position, and
FIGURE 4 is a view along the line 4—4 of FIGURE 3.

The numeral 10 refers to an electrical conductor having an insulant 12 therearound. The conductor has been terminated as at 13 for connection to a connector or the like, and it is necessary to provide for a stress control cone over the cable insulant at the termination. This invention, as indicated above, relates to a facile method of making this stress control cone of predetermined profile and dimensions.

In the embodiment of the invention illustrated, five sleeves 14, 16, 18, 20 and 22 of a heat-shrinkable plastic material are arranged about the cable insulant in concentric arrangement, as shown in FIGURES 1 and 2. The sleeves are flexible and of a size that they can be inserted within each other and slipped over the cable insultant.

Sleeves 14, 16, 18, 20 and 22 are made from a heat shrinkable plastic material commonly available and generally comprising a material that has been subjected to massive doses of electron beam radiation to form a cross linked three dimensional gel network to give a mechanically tough and flexible tubing which will not cold flow but which will shrink on the application of heat. Materials of this nature that positively reduce 50% on heating are common and offered for sale by Raychem Corporation and by Dow Corning Corporation. In addition to polyolefin, they are commonly made from modified fluorocarbon, modified polyvinylchloride, modified neoprene rubber and silicone rubber. This invention is not concerned with the plastic material per se, but rather with a method of forming the stress control cone described herein.

Once the sections are loosely arranged as indicated in FIGURES 1 and 2, heat is applied to the sleeves whereby they shrink tightly to engage with each other and to engage with the cable insulant, as illustrated in FIGURES 3 and 4.

The lengths of the sections 14, 16, 18, 20 and 22 vary and the sections are arranged such that one free end of each of the sections extends further than the one immediately outside thereof to form a stress control cone profile 24 between the stress control cone outer cylindrical surface 26 and the cable insulant outer surface.

Thus it will be apparent that from five simple sleeves of a plastic material cut to predetermined lengths, arranged concentrically on a cable, as indicated above, and shrunk, the required stress control cone is formed.

Modifications of the invention other than the one illustrated will be apparent to those skilled in the art. For example, various shrinkable materials may be used. The basic concept of the invention is to provide a plurality of sleeves that can shrink on to an insulated cable to form the predetermined stress control cone required for terminating the end of the cable to some piece of electrical apparatus or to form the predetermined stress control cones required in joining two insulated cables.

What I claim as my invention is:

1. A method of forming a stress control cone on a cable comprising the steps of taking a plurality of tubular sections of dielectric material, said dielectric material being shrinkable to reduce the diameter of said tubular sections, building said tubular sections in concentric arrangement about a cable with the end portions at at least one of their ends progressively staggered to define a stress control cone profile by slipping each of said tubular sections into place in relation to the cable and shrinking it to tighten it into position, one of said tubular sections being thereby tightly shrunk against the cable and each of the others of said tubular sections being tightly shrunk against the tubular section immediately inside thereof.

2. A method of forming a stress control cone as claimed in claim 1, in which said tubular sections are of a heat-shrinkable plastic material.

References Cited

UNITED STATES PATENTS

| 3,317,655 | 5/1967 | Oatess et al. | 174—73 |
| 3,035,113 | 5/1962 | Danchuk | 174—75 X |
| 3,210,460 | 10/1965 | Suelmann | 174—127 X |
| 3,243,211 | 3/1966 | Wetmore. | |

FOREIGN PATENTS 297,571   6/1954   Switzerland.

OTHER REFERENCES

Silbermann: German printed appl., No. 1,079,707, Apr. 14, 1960.

LARAMIE E. ASKIN, *Primary Examnier.*